July 27, 1965  H. BRAUN-ANGOTT  3,197,259
PNEUMATIC CONVEYOR APPARATUS HAVING A PRESSURE
CONTAINER FOR PULVERULENT OR GRANULAR MATERIAL
Filed Dec. 14, 1962  2 Sheets-Sheet 1

INVENTOR
Heinrich Braun-Angott by Richard J. Striker
Atty

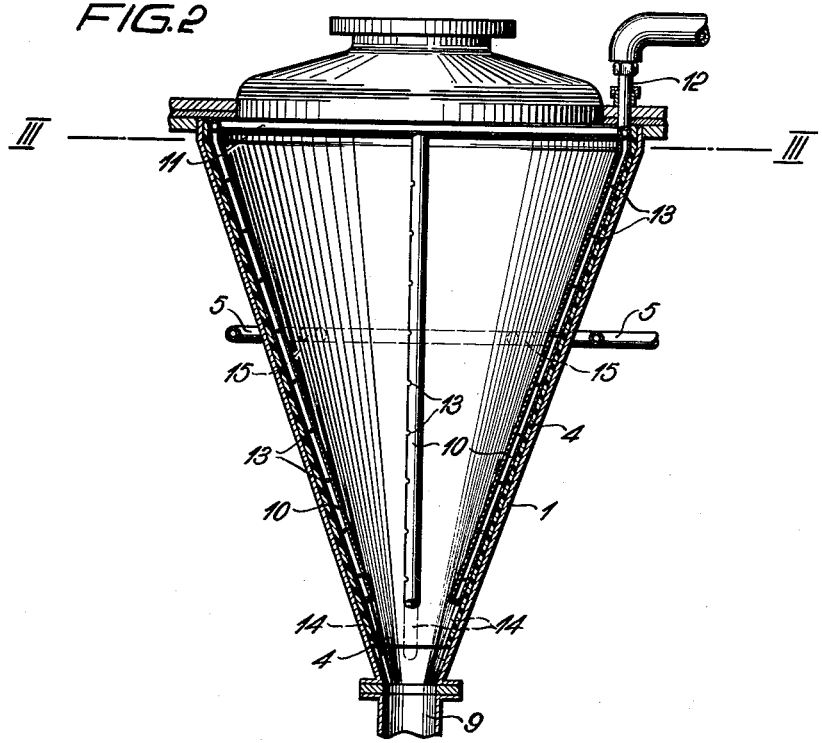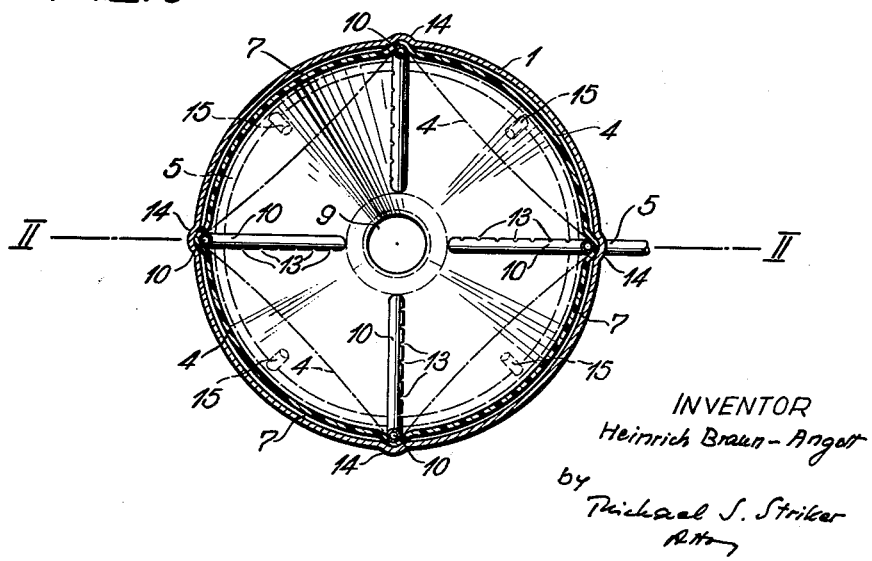

United States Patent Office 3,197,259
Patented July 27, 1965

3,197,259
PNEUMATIC CONVEYOR APPARATUS HAVING A PRESSURE CONTAINER FOR PULVERULENT OR GRANULAR MATERIAL
Heinrich Braun-Angott, 11 Berliner Strasse, Hagen, Westphalia, Germany
Filed Dec. 14, 1962, Ser. No. 244,711
Claims priority, application Germany, Dec. 19, 1961, B 65,245
7 Claims. (Cl. 302—53)

This invention relates to a pneumatic conveyor apparatus having a pressure container for pulverulent or granular material.

The object of the invention is to construct a pressure container so that it can be used not only for dry and free-flowing material but in particular also for moist material having a tendency to cake, and at the same time to obtain a greater conveying capacity.

To achieve this object, the invention provides a pneumatic conveyor apparatus having a pressure container for pulverulent or granular material, which comprises an elastic lining in a conical part of the pressure container and attached at least with its upper edge to the upper inner end of the conical part, a conveying pipe connected to the lower end of the conical part, a compressed-air supply for feeding compressed air into at least one space formed between the lining and the inner wall of the conical part of the pressure container so as to lift the lining therefrom, move it towards the middle thereof except at the positions of attachment, emerge at the lower end of the elastic lining from the space, and be admixed to the material falling into the conveying pipe.

The lower edge of the elastic lining is preferably freely movable or partly secured to the conical part of the pressure container.

In a particular advantageous embodiment of the invention the elastic lining may be connected to the inner wall of the pressure container in such a manner that the space between the inner wall of the pressure container and the elastic lining is divided into a plurality of individual spaces each connected with the compressed-air supply and extending in the conveying direction.

The individual spaces are preferably formed by removably inserting in the elastic lining a frame composed of stays arranged in the form of a pyramid and pointing in the conveying direction and adapted to press the elastic lining from the inside against the inner wall of the pressure container. The stays may be constructed as compressed-air pipes and each embedded in a fold-like recess in the wall of the container. They are provided in the longitudinal direction with a row of air discharge apertures arranged tangentially to the wall of the container or to the elastic lining, respectively. By this means, combined with the movement of the elastic lining, the material to be conveyed is loosened up in a particularly effective manner and any undesirable caking of the material is reliably prevented.

Three preferred embodiments of the invention will now be described by way of example and with reference to the accompanying drawings, in which:

FIG. 2 is a longitudinal section through a second embodiment, taken on the line II—II of FIG. 3;

FIG. 3 is a cross section taken on the line III—III of FIG. 2;

Figure 1:
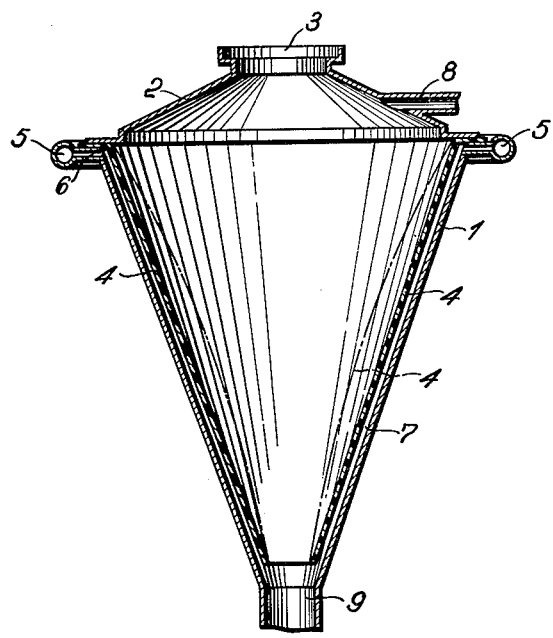
FIG. 1 is a longitudinal section through a first embodiment of the pneumatic conveyor apparatus according to the invention.

FIG. 1 shows a pressure tank or container 1 the conical part of which is connected at its lower end to a conveying pipe 9. The container 1 is provided with a cover 2 which has a closable filling opening 3 for introducing the material to be conveyed. The inner wall of the conical part of the pressure container 1 is provided with an elastic lining 4 the upper edge of which is connected with the wall of the conical part of the pressure container 1 in such a manner that the space 7 formed between the conical part of the pressure container 1 and the elastic lining 4 is hermetically closed at the top.

The elastic lining 4 is pressed against the inner wall of the conical part of the pressure container 1 by the material fed into the pressure container 1. If compressed air is now blown from an annular compressed-air conduit 5 through connecting pipes 6 into the space 7 formed between the wall of the conical part of the pressure container 1 and the elastic lining 4, the lining 4 will be forced inwardly as indicated in dot and dash lines. By this movement of the lining 4 any material which may have caked thereon is loosened. It has also been found advisable to introduce compressed air above the material to be conveyed in the proximity of the filling opening 3 through a pipe 8, which air will then force the material in the pressure container 1 through the outlet aperture into the conveying pipe 9. By the air simultaneously escaping from the space 7 in downward direction into the conveying pipe 9, the material to be conveyed is intensively mixed with air, rendered suitable for conveying and the conveying capacity of the compressed air admitted through the pipe 8 is assisted.

In the embodiment illustrated in FIGS. 2 and 3 a further improvement is achieved in that a tubular frame of pyramidal shape composed, for example, of four stays which may be constructed as longitudinal compressed-air pipes 10, is inserted in the pressure container 1, the upper ends of these pipes being connected to a common annular compressed-air pipe 11. Compressed air is introduced into the tubular frame through a connecting piece 12 and can escape through discharge apertures 13 arranged in rows in each of the longitudinal pipes 10. The tubular frame is exchangeably fitted in the pressure container 1, the longitudinal pipes 10 bearing against the wall of the pressure container 1 being preferably embedded with part of their circumference in fold-like recesses 14. Thus, on the one hand, the tubular frame is held in position in relation to the pressure container 1, and, on the other hand, the pipes are prevented from projecting too far into the interior of the container 1. An advantageous arrangement of the air discharge openings 13 is obtained if the air on passing out is guided so that it is blown along the inner wall of the elastic lining 4 with the result that any adhesion thereon of the material to be conveyed is prevented from the outset.

The four longitudinal pipes 10 of the tubular frame sealingly press the elastic lining 4 against the wall of the pressure container 1 with the result that four spaces 7, narrowing in the conveying direction, are formed between the wall of the pressure container 1 and the elastic lining 4. The lining 4 is fixed in an air-tight yet detachable manner at its upper edge to the pressure container 1, whereas the spaces are open at their lower ends so that the compressed air fed into the spaces 7 can escape in downward direction and mix with the material to be conveyed.

The compressed air serving for moving the elastic lining 4 is taken from an annular pipe $5^1$ which is connected to each individual space 7 by means of radially inwardly directed tubular nipples 15 arranged between the fold-like recesses 14. If, after the material to be conveyed has been introduced into the pressure container 1, compressed air is blown into the spaces 7 the lining 4 will move towards the middle of the container, thereby assuming, for example, a position 4¹ indicated in dot and dash lines in FIG. 3. At the same time the loosened material is prevented from adhering to the elastic lining 4 by the air escaping from the nozzle-like discharge apertures 13 and brushing along the inner wall of the elastic lining 4.

Figure 4:
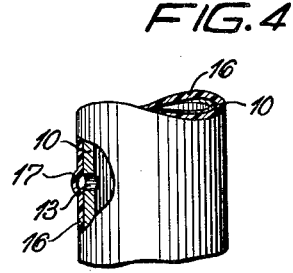
FIG. 4 is an elevational view, on a larger scale and partly in section, of a portion of a tubular stay.

As can be seen from FIG. 4, it is advantageous in the case of fine granular material to be conveyed to slip on to the longitudinal pipes 10 elastic sleeves 16 which preferably have in the proximity of the discharge apertures 13 fine holes or perforations 17 which open like valves when subjected to compressed air from the interior of the longitudinal pipes 10. When they are not thus subjected to compressed air the fine holes or perforations 17 are tightly closed by the elasticity of the material of the sleeves 16. These sleeves 16 prevent wear of the longitudinal pipes 10, they can easily be exchanged and form a kind of check valve as they prevent the air discharge apertures 13 and the longitudinal pipes 10 from becoming clogged with the material to be conveyed.

It will be understood that the invention is not restricted to the illustrated embodiments. Thus, for example, the frame carrying the elastic lining may be of polygonal cross section and composed of any desired number of stays or longitudinal pipes 10. Furthermore, other means may be employed for moving the elastic lining to suit the kind of material actually to be conveyed. The frame carrying the elastic lining may also be composed of pipes having a different, for example, elliptical cross section, or formed partly or entirely of solid stays and exchangeably held in the pressure container 1 in some other way. Then again several elastic linings may be arranged one above the other at distances apart in the pressure container 1 and form a plurality of annular horizontal chambers each connected to the compressed-air supply, whereby the upper and lower edge portions of the neighbouring linings partly engaging one in the other each form an annular gap for the passage therethrough of the compressed air acting on the material to be conveyed. The invention may be applied in a similar manner also to other containers or vessels from which suitable materials are to be taken, eventually in portions.

I claim:

1. Pneumatic conveyor apparatus comprising, in combination, a pressure container for pulverulent granular material, said pressure container having a downwardly tapering conical part; a conical elastic lining in said conical part of said pressure container and attached at its upper edge thereof to the upper end of said conical part and being slightly spaced over a major portion thereof from the inner surface of said conical part, so as to form a space between itself and the inner surface of said conical part; partition means subdividing said space into a plurality of individual spaces; a conveying pipe connected to the lower end of said conical part; and means for feeding compressed gas into each of said individual spaces between the inner surface of said conical part of said pressure container and said conical lining so as to move the unattached portions of said lining further away from the inner surface of the conical part and to cause said compressed gas to emerge in an annular stream at the lower end of said conical lining from said space to be admixed to the material falling into said conveyor pipe.

2. Pneumatic conveyor apparatus comprising, in combination, a pressure container for pulverulent granular material, said pressure container having a downwardly tapering conical part; a conical elastic lining in said conical part of said pressure container and attached at its upper edge thereof to the upper end of said conical part and being slightly spaced over a major portion thereof from the inner surface of said conical part; a plurality of stays located within said conical elastic lining extending substantially in direction of generatrices of said lining angularly spaced from each other and engaging the inner surface of said lining to press the latter at angularly spaced portions thereof against the inner surface of said conical part of said pressure container so as to divide the space between the inner surface of said conical part of said pressure container into a plurality of individual spaces; a conveying pipe connected to the lower end of said conical part; and means for feeding compressed gas into said individual spaces between the inner surface of said conical part of said pressure container and said conical lining so as to move the unattached portions of said lining further away from the inner surface of the conical part and to cause said compressed gas to emerge in adjacent streams at the lower end of said conical lining from said spaces to be admixed to the material falling into said conveyor pipe.

3. An apparatus as claimed in claim 2, wherein the stays are united to form an exchangeable tubular frame.

4. An apparatus as claimed in claim 2, wherein the stays are constructed as longitudinal compressed-air pipes and provided with laterally arranged discharge apertures for the compressed air distributed along their lengths.

5. An apparatus as claimed in claim 4, wherein each compressed-air pipe is surrounded by an elastic sleeve provided in the region of the discharge apertures with fine perforations adapted to open under the action of the compressed-air and to close elastically when the compressed-air supply is cut off.

6. An apparatus as claimed in claim 2, wherein each stay is embedded in a fold-like recess in the inner wall of the pressure container.

7. An apparatus as claimed in claim 4, wherein the compressed-air pipes are connected at their upper ends to a common annular compressed-air pipe which at the same time closes the spaces between the inner wall of the pressure container and the elastic lining at the top.

References Cited by the Examiner

UNITED STATES PATENTS

| 2,255,438 | 9/41 | Robinson | 302—53 |
| 2,518,811 | 8/50 | Nicholson | 302—53 |
| 2,684,871 | 7/54 | Shields | 302—53 |
| 2,771,323 | 11/56 | Taylor | 302—57 |
| 2,792,262 | 5/57 | Hathorn | 302—52 |
| 2,794,686 | 6/57 | Anselman | 302—53 |
| 2,956,839 | 10/60 | Hermanns | 302—53 |
| 3,099,494 | 7/63 | Heinze | 302—31 |

SAMUEL F. COLEMAN, *Primary Examiner.*

ANDRES H. NIELSEN, ERNEST A. FALLER,
*Examiners.*